US012726858B2

(12) United States Patent
Zhang et al.

(10) Patent No.: US 12,726,858 B2
(45) Date of Patent: Sep. 1, 2026

(54) QoE CONFIGURATION METHOD AND APPARATUS DURING RRC RESUMING PROCESS

(71) Applicant: DATANG MOBILE COMMUNICATIONS EQUIPMENT CO., LTD., Beijing (CN)

(72) Inventors: Mingzhu Zhang, Beijing (CN); Chunlin Ni, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 281 days.

(21) Appl. No.: 18/688,188

(22) PCT Filed: Jun. 22, 2022

(86) PCT No.: PCT/CN2022/100515
§ 371 (c)(1),
(2) Date: Feb. 29, 2024

(87) PCT Pub. No.: WO2023/050918
PCT Pub. Date: Apr. 6, 2023

(65) Prior Publication Data

US 2025/0008381 A1 Jan. 2, 2025

(30) Foreign Application Priority Data

Sep. 29, 2021 (CN) ......................... 202111151906.X

(51) Int. Cl.
*H04W 28/24* (2009.01)
*H04L 41/5067* (2022.01)
(Continued)

(52) U.S. Cl.
CPC ......... *H04W 28/24* (2013.01); *H04L 41/5067* (2013.01); *H04W 28/0268* (2013.01); *H04W 76/27* (2018.02)

(58) Field of Classification Search
CPC . H04W 28/24; H04W 28/0268; H04W 76/27; H04W 24/08; H04W 24/10; H04L 41/5067
See application file for complete search history.

(56) References Cited

U.S. PATENT DOCUMENTS

| | | | | |
|---|---|---|---|---|
| 11,316,759 | B2 * | 4/2022 | Van Oost | H04W 24/04 |
| 12,256,263 | B2 * | 3/2025 | Puente Pestaña | H04L 41/5025 |

(Continued)

FOREIGN PATENT DOCUMENTS

| | | | | |
|---|---|---|---|---|
| AU | 2022460186 | A1 * | 10/2024 | H04W 24/10 |
| CA | 3238126 | A1 * | 4/2024 | H04W 24/08 |

(Continued)

OTHER PUBLICATIONS

Huawei, HiSilicon, QoE handling during UE mobility, 3GPP TSG RAN Meeting #113-e R2-2101190, Jan. 25-Feb. 5, 2021.

(Continued)

*Primary Examiner* — Michael A Keller
(74) *Attorney, Agent, or Firm* — Meunier Carlin & Curfman LLC

(57) ABSTRACT

Disclosed are a QoE configuration method and apparatus during an RRC resuming process. The method includes: during a process of a terminal resuming RRC, acquiring QoE configuration information of the terminal; and determining a first QoE configuration according to the QoE configuration information, and instructing the terminal to release the first QoE configuration. By means of the present application, it can be ensured that a network side can notify
(Continued)

Terminal | Network side apparatus

Terminal transmits RRC Resume Requset message to network side apparatus

Network side apparatus transmits RRC Resume message

Terminal replies with RRC Resume Complete message the terminal to release/store some of the QoE configuration information during an RRC resuming/switching process.

14 Claims, 7 Drawing Sheets

(51) Int. Cl.
*H04W 28/02* (2009.01)
*H04W 76/27* (2018.01)

(56) References Cited

U.S. PATENT DOCUMENTS

| | | | | |
|---|---|---|---|---|
| 2020/0022034 | A1* | 1/2020 | Shi | H04W 24/10 |
| 2020/0120742 | A1 | 4/2020 | Mildh et al. | |
| 2022/0217560 | A1* | 7/2022 | Kumar | H04W 24/08 |
| 2022/0264373 | A1* | 8/2022 | Kim | H04W 28/24 |
| 2023/0292166 | A1* | 9/2023 | Centonza | H04W 24/08 |
| 2023/0308925 | A1* | 9/2023 | Hu | H04W 28/0268 |
| 2023/0388830 | A1* | 11/2023 | Eklöf | H04W 36/0085 |
| 2024/0031253 | A1* | 1/2024 | Liu | H04L 41/5067 |
| 2024/0049258 | A1* | 2/2024 | Bae | H04W 76/40 |
| 2024/0106724 | A1* | 3/2024 | Jung | H04L 41/5067 |
| 2024/0155400 | A1* | 5/2024 | Jeong | H04W 28/0268 |
| 2024/0224100 | A1* | 7/2024 | Jung | H04W 24/10 |
| 2024/0340991 | A1* | 10/2024 | Jeong | H04W 76/40 |
| 2024/0349108 | A1* | 10/2024 | Zhang | H04W 28/16 |
| 2024/0365150 | A1* | 10/2024 | Babaei | H04W 74/0836 |
| 2024/0414072 | A1* | 12/2024 | Nuggehalli | H04W 24/08 |
| 2025/0203396 | A1* | 6/2025 | Krishnan | H04W 24/02 |
| 2025/0240225 | A1* | 7/2025 | Bergström | H04W 24/10 |
| 2025/0301346 | A1* | 9/2025 | Yang | H04W 24/10 |
| 2025/0351007 | A1* | 11/2025 | Di Girolamo | H04W 28/24 |

FOREIGN PATENT DOCUMENTS

| | | | | | |
|---|---|---|---|---|---|
| CN | 110326328 | A | | 10/2019 | |
| CN | 111819879 | A | | 10/2020 | |
| CN | 113938921 | A | * | 1/2022 | H04W 28/0289 |
| CN | 114051253 | A | * | 2/2022 | H04W 36/0011 |
| CN | 114071547 | A | * | 2/2022 | H04W 72/54 |
| CN | 114071560 | A | * | 2/2022 | H04W 24/10 |
| CN | 114189886 | A | * | 3/2022 | H04W 24/02 |
| CN | 114828071 | A | * | 7/2022 | H04W 24/08 |
| CN | 114885354 | A | * | 8/2022 | H04W 24/02 |
| CN | 115086999 | A | * | 9/2022 | H04W 24/02 |
| CN | 115150846 | A | * | 10/2022 | H04W 24/02 |
| CN | 115314934 | A | * | 11/2022 | H04L 41/5067 |
| CN | 115334571 | A | * | 11/2022 | H04W 24/08 |
| CN | 115348607 | A | * | 11/2022 | H04W 24/02 |
| CN | 115843440 | A | * | 3/2023 | H04W 76/27 |
| CN | 115884439 | A | * | 3/2023 | H04W 28/0268 |
| CN | 116235528 | A | * | 6/2023 | H04W 24/08 |
| CN | 116671080 | A | * | 8/2023 | |
| CN | 116711359 | A | * | 9/2023 | H04W 36/0088 |
| CN | 116806034 | A | * | 9/2023 | H04W 24/02 |
| CN | 116916350 | A | * | 10/2023 | H04W 24/02 |
| CN | 117354854 | A | * | 1/2024 | H04W 24/08 |
| CN | 117354855 | A | * | 1/2024 | H04W 24/08 |
| CN | 117545002 | A | * | 2/2024 | H04W 24/10 |
| CN | 117715070 | A | * | 3/2024 | H04W 24/10 |
| CN | 117796014 | A | * | 3/2024 | H04W 76/30 |
| CN | 118120277 | A | * | 5/2024 | H04W 28/0268 |
| CN | 118786698 | A | * | 10/2024 | H04W 28/0268 |
| CN | 118945719 | A | * | 11/2024 | H04W 76/27 |
| CN | 119072950 | A | * | 12/2024 | H04W 28/0284 |
| CN | 119156803 | A | * | 12/2024 | H04L 43/065 |
| CN | 119522602 | A | * | 2/2025 | H04W 24/08 |
| CN | 119584151 | A | * | 3/2025 | H04W 24/08 |
| CN | 119584191 | A | * | 3/2025 | H04W 24/08 |
| CN | 119631382 | A | * | 3/2025 | H04W 24/10 |
| CN | 119729603 | A | * | 3/2025 | |
| CN | 119923659 | A | * | 5/2025 | H04L 41/5067 |
| CN | 119946699 | A | * | 5/2025 | |
| CN | 120019682 | A | * | 5/2025 | H04W 24/10 |
| CN | 120052015 | A | * | 5/2025 | H04W 52/0206 |
| CN | 120266530 | A | * | 7/2025 | H04W 24/08 |
| CN | 120322995 | A | * | 7/2025 | H04W 24/10 |
| CN | 120604558 | A | * | 9/2025 | H04W 76/27 |
| CN | 121040129 | A | * | 11/2025 | H04W 36/0083 |
| EP | 2779718 | A1 | * | 9/2014 | H04W 24/08 |
| EP | 4132081 | A1 | * | 2/2023 | H04W 76/15 |
| EP | 4171109 | A1 | * | 4/2023 | H04W 8/24 |
| EP | 4284054 | B1 | * | 8/2025 | H04W 24/08 |
| EP | 4615030 | A1 | * | 9/2025 | H04W 24/08 |
| EP | 4654656 | A1 | * | 11/2025 | H04W 28/06 |
| GB | 2608259 | A | * | 12/2022 | H04W 76/34 |
| GB | 2631652 | A | * | 1/2025 | H04W 24/10 |
| GB | 2635477 | A | * | 5/2025 | H04W 24/10 |
| JP | 6701196 | B2 | * | 5/2020 | H04L 41/5025 |
| JP | 2022543150 | A | * | 10/2022 | H04W 24/04 |
| JP | 2022550863 | A | * | 12/2022 | H04L 41/5032 |
| JP | WO2022246016 | A5 | * | 2/2025 | |
| JP | 2026507603 | A | * | 3/2026 | H04W 36/08 |
| KR | 20170139540 | A | * | 12/2017 | H04W 80/10 |
| KR | 20230149694 | A | * | 10/2023 | H04W 24/10 |
| KR | 20240039298 | A | * | 3/2024 | H04L 41/0806 |
| KR | 20240123926 | A | * | 8/2024 | H04W 24/10 |
| KR | 20250046931 | A | * | 4/2025 | H04W 76/27 |
| KR | 20250049348 | A | * | 4/2025 | H04L 41/5067 |
| KR | 20250114765 | A | * | 7/2025 | H04W 72/231 |
| KR | 20250114779 | A | * | 7/2025 | H04W 76/27 |
| KR | 20250159870 | A | * | 11/2025 | H04W 76/10 |
| WO | 2020230019 | A1 | | 11/2020 | |
| WO | WO-2021201522 | A1 | * | 10/2021 | H04W 28/0268 |
| WO | WO-2021211042 | A1 | * | 10/2021 | H04W 80/02 |
| WO | WO-2021242156 | A1 | * | 12/2021 | H04W 24/10 |
| WO | WO-2021242157 | A1 | * | 12/2021 | H04L 41/5009 |
| WO | WO-2022005356 | A1 | * | 1/2022 | H04W 24/08 |
| WO | WO-2022005359 | A1 | * | 1/2022 | H04L 45/243 |
| WO | WO-2022005360 | A1 | * | 1/2022 | H04L 65/80 |
| WO | WO-2022005361 | A1 | * | 1/2022 | H04W 24/10 |
| WO | WO-2022005376 | A1 | * | 1/2022 | H04W 28/0289 |
| WO | WO-2022005377 | A1 | * | 1/2022 | H04W 24/10 |
| WO | WO-2022005379 | A1 | * | 1/2022 | H04W 24/10 |
| WO | WO-2022029680 | A1 | * | 2/2022 | H04L 41/5009 |
| WO | WO-2022086386 | A1 | * | 4/2022 | H04L 43/062 |
| WO | WO-2022150004 | A1 | * | 7/2022 | H04L 41/5067 |
| WO | WO-2022150406 | A1 | * | 7/2022 | H04W 24/10 |
| WO | WO-2022154713 | A1 | * | 7/2022 | H04W 8/24 |
| WO | WO-2022164379 | A1 | * | 8/2022 | H04W 24/08 |
| WO | WO-2022164380 | A1 | * | 8/2022 | H04W 36/0069 |
| WO | WO-2022180619 | A1 | * | 9/2022 | H04L 65/80 |
| WO | WO-2022193177 | A1 | * | 9/2022 | H04W 24/02 |
| WO | WO-2022211597 | A1 | * | 10/2022 | H04W 76/27 |
| WO | WO-2022225142 | A1 | * | 10/2022 | H04W 24/10 |
| WO | WO-2022237601 | A1 | * | 11/2022 | H04W 24/10 |
| WO | WO-2023282421 | A1 | * | 1/2023 | H04L 51/58 |
| WO | WO-2023047332 | A1 | * | 3/2023 | H04W 24/02 |
| WO | WO-2023048127 | A1 | * | 3/2023 | H04W 24/08 |
| WO | WO-2023068980 | A1 | * | 4/2023 | H04W 48/18 |
| WO | WO-2023069000 | A1 | * | 4/2023 | H04W 24/02 |
| WO | WO-2023073656 | A1 | * | 5/2023 | H04W 24/10 |
| WO | WO-2023116176 | A1 | * | 6/2023 | H04W 24/10 |
| WO | WO-2023140768 | A1 | * | 7/2023 | H04W 24/10 |
| WO | WO-2023204451 | A1 | * | 10/2023 | H04W 76/20 |
| WO | WO-2023204605 | A1 | * | 10/2023 | H04W 76/40 |
| WO | WO-2023219417 | A1 | * | 11/2023 | H04W 24/10 |
| WO | WO-2023223081 | A1 | * | 11/2023 | H04W 24/10 |
| WO | WO-2023224527 | A1 | * | 11/2023 | H04W 24/10 |
| WO | WO-2024010269 | A1 | * | 1/2024 | H04W 24/10 |
| WO | WO-2024014898 | A1 | * | 1/2024 | H04W 24/08 |
| WO | WO-2024019652 | A1 | * | 1/2024 | H04W 24/10 |
| WO | WO-2024022023 | A1 | * | 2/2024 | H04W 4/06 |
| WO | WO-2024022441 | A1 | * | 2/2024 | H04W 28/24 |
| WO | WO-2024027687 | A1 | * | 2/2024 | H04W 28/24 |
| WO | WO-2024027805 | A1 | * | 2/2024 | H04W 24/08 |
| WO | WO-2024035119 | A1 | * | 2/2024 | H04W 36/16 |
| WO | WO-2024043818 | A1 | * | 2/2024 | H04L 41/5067 |
| WO | WO-2024069586 | A1 | * | 4/2024 | H04W 28/24 |
| WO | WO-2024071998 | A1 | * | 4/2024 | H04W 76/27 |
| WO | WO-2024072290 | A1 | * | 4/2024 | H04W 4/06 |
| WO | WO-2024091158 | A1 | * | 5/2024 | H04W 24/10 |
| WO | WO-2024096796 | A1 | * | 5/2024 | H04W 24/08 |

(56) References Cited

FOREIGN PATENT DOCUMENTS

| | | | | |
|---|---|---|---|---|
| WO | WO-2024210794 A1 * | 10/2024 | ............ | H04W 24/10 |
| WO | WO-2024220017 A1 * | 10/2024 | ............ | H04W 24/10 |
| WO | WO-2025014269 A1 * | 1/2025 | ............ | H04W 76/40 |
| WO | WO-2025033769 A1 * | 2/2025 | ........... | H04L 43/062 |
| WO | WO-2025033865 A1 * | 2/2025 | .............. | H04W 8/24 |
| WO | WO-2025075540 A1 * | 4/2025 | ............ | H04W 24/08 |
| WO | WO-2025095349 A1 * | 5/2025 | ......... | H04L 41/5067 |
| WO | WO-2025095604 A1 * | 5/2025 | ......... | H04L 41/5067 |
| WO | WO-2025155225 A1 * | 7/2025 | ............ | H04W 24/10 |
| WO | WO-2025172757 A1 * | 8/2025 | ............ | H04W 24/10 |
| WO | WO-2025172836 A1 * | 8/2025 | ............. | H04L 65/80 |
| WO | WO-2025234723 A1 * | 11/2025 | ......... | H04L 41/5067 |

OTHER PUBLICATIONS

Huawei, HiSilicon, QoE handling during UE mobility, 3GPP TSG RAN WG2 Meeting #115-e R2-2108207, Aug. 9-27, 2021.

Huawei, HiSilicon, Report of offline: [AT115-e][046][QoE] Mobility (Huawei), 3GPP TSG RAN WG2 Meeting #115 R2-2109105, Aug. 9-27, 2021.

Ericsson, "Summary of Offline Discussion on RAN-visible QoE," 3GPP TSG-RAN WG3 Meeting #113-e, R3-214198, Aug. 16, 2021-Aug. 26, 2021.

* cited by examiner

QoE CONFIGURATION METHOD AND APPARATUS DURING RRC RESUMING PROCESS

CROSS-REFERENCE TO RELATED APPLICATIONS

The present application is a National Stage of International Application No. PCT/CN2022/100515, filed Jun. 22, 2022, which claims priority to Chinese Patent Application 202111151906.X, filed with the China National Intellectual Property Administration on Sep. 29, 2021 and entitled "QoE Configuration Method and Apparatus for RRC Resume Process", which is hereby incorporated by reference in its entirety.

TECHNICAL FIELD

The present application relates to the field of communication technology, and in particular, to a QoE configuration method and apparatus for an RRC resume process.

BACKGROUND

In the R17 NR QoE (Quality of Experience), the terminal is supported to save the configuration in the connected state under the RRC_INACTIVE (RRC connection inactive) state, but the QoE measurement in the RRC_INACTIVE state is not supported.

In the RRC_INACTIVE state, the terminal may save the QoE configuration that has enabled measurement or the QoE configuration that has not yet enabled measurement. When the terminal resumes to a cell that supports QoE measurement during the RRC (Radio Resource Control) resume process but this cell is outside the QoE configuration area (the QoE configuration may be invalid), or the currently resumed cell is under too heavy load (the QoE configuration that has not yet enabled measurement does not require QoE measurement), or the currently resumed cell does not support QoE measurement (QoE configuration is invalid) while it is possible to be unable to fully obtain all QoE configuration information configured for the terminal, so that the resumed cell cannot correctly release the invalid QoE configuration or the QoE configuration that no longer requires QoE measurement.

SUMMARY

The present application provides a QoE configuration method and apparatus for the RRC resume process, to ensure that the network side can notify the terminal to release or store a part of the QoE configuration information during the RRC resume or handover process.

According to a first aspect of embodiments of the present application, provided is a method for QoE configuration during an RRC resume process, applied to a first network side apparatus, including:

obtaining QoE configuration information of a terminal during an RRC resume process of the terminal; and determining a first QoE configuration according to the QoE configuration information, and instructing the terminal to release the first QoE configuration.

In some embodiments, the QoE configuration information includes at least one of:

a QoE configuration with measurement enabled; or a QoE configuration without measurement enabled.

In some embodiments, the obtaining the QoE configuration information of the terminal during the RRC resume process of the terminal, includes:

receiving an RRC resume request message transmitted by the terminal; and obtaining the QoE configuration information of the terminal from the terminal or a second network side apparatus, where the second network side apparatus is a network side apparatus that configures QoE configuration for the terminal.

In some embodiments, the obtaining the QoE configuration information of the terminal from the terminal or the second network side apparatus, includes:

transmitting a QoE configuration information request to the terminal or the second network side apparatus; and receiving the QoE configuration information transmitted by the terminal or the second network side apparatus according to the QoE configuration information request.

In some embodiments, the QoE configuration information includes at least one of: complete first QoE configuration parameter information received from the second network side apparatus; or second QoE configuration parameter information only visible to an AS (Access Stratum).

In some embodiments, the second QoE configuration parameter information includes at least one of:

at least one of: a service type corresponding to QoE configuration, identification information of QoE configuration, a priority of a service type corresponding to QoE configuration, a priority of identification information of QoE configuration, a QoE configuration type, a cache state of QoE configuration, or a playing delay of QoE configuration;

at least one of: a service type corresponding to a QoE configuration type based on signaling, identification information of QoE configuration based on signaling, a priority of a service type based on signaling, a priority of identification information of QoE configuration based on signaling, a priority of the QoE configuration type based on signaling, a cache state of QoE configuration based on signaling, or a playing delay of QoE configuration based on signalling; or at least one of: a service type corresponding to a QoE configuration type based on management, identification information of QoE configuration based on management, a priority of a service type based on management, a priority of identification information of QoE configuration based on management, a priority of the QoE configuration type based on management, a cache state of QoE configuration based on management, or a playing delay of QoE configuration based on management.

In some embodiments, the determining the first QoE configuration according to the QoE configuration information, includes at least one of:

determining a service type of the first QoE configuration according to the QoE configuration information;

determining identification information of the first QoE configuration according to the QoE configuration information;

determining a priority of the service type of the first QoE configuration according to the QoE configuration information;

determining a priority of the identification information of the first QoE configuration according to the QoE configuration information; or determining a first QoE configuration type according to the QoE configuration information.

According to a second aspect of embodiments of the present application, provided is a method for QoE configuration during an RRC resume process, applied to a terminal, including: transmitting QoE configuration information of the terminal to a first network side apparatus during the RRC resume process;

receiving a release instruction transmitted by the first network side apparatus, where the release instruction includes a first QoE configuration; and releasing the first QoE configuration according to the release instruction.

In some embodiments, the releasing the first QoE configuration according to the release instruction, includes at least one of:

releasing, according to a service type of the first QoE configuration in the release instruction, a QoE configuration corresponding to the service type;

releasing, according to identification information of the first QoE configuration in the release instruction, a QoE configuration corresponding to the identification information;

releasing, according to a priority of the service type of the first QoE configuration in the release instruction, a QoE configuration corresponding to the priority of the service type;

releasing, according to a priority of the identification information of the first QoE configuration in the release instruction, a QoE configuration corresponding to the priority of the identification information; or releasing, according to a first QoE configuration type in the release instruction, a QoE configuration corresponding to the configuration type.

According to a third aspect of embodiments of the present application, provided is a method for QoE configuration during an RRC resume process, applied to a second network side apparatus, including:

performing a QoE configuration for a terminal; and transmitting QoE configuration information of the terminal to a first network side apparatus during the RRC resume process of the terminal, where the first network side apparatus is an apparatus that performs RRC resume connection with the terminal.

According to a fourth aspect of embodiments of the present application, provided is an apparatus for QoE configuration during an RRC resume process, including:

a QoE configuration information obtaining module configured to obtain QoE configuration information of a terminal during the RRC resume process of the terminal by means of the first network side apparatus; and a QoE configuration information determining module configured to determine a first QoE configuration according to the QoE configuration information and instruct the terminal to release the first QoE configuration by means of the first network side apparatus.

According to a fifth aspect of embodiments of the present application, provided is an apparatus for QoE configuration during an RRC resume process, including:

a QoE configuration information transmitting module configured to transmit QoE configuration information of the terminal to a first network side apparatus during the RRC resume process by means of the terminal;

a release instruction receiving module configured to receive a release instruction transmitted by the first network side apparatus by means of the terminal, where the release instruction includes a first QoE configuration; and a QoE configuration release module configured to release the first QoE configuration according to the release instruction by means of the terminal.

According to a sixth aspect of embodiments of the present application, provided is an apparatus for QoE configuration during an RRC resume process, including:

a QoE configuration module, configured to perform a QoE configuration for a terminal by means of a second network side apparatus; and a QoE configuration information transmitting module, configured to transmit QoE configuration information of the terminal to a first network side apparatus during the RRC resume process of the terminal by means of the second network side apparatus, where the first network side apparatus is an apparatus that performs RRC resume connection with the terminal.

According to a seventh aspect of embodiments of the present application, provided is an apparatus for QoE configuration during an RRC resume process, including: a processor; and a memory configured to store processor executable instructions; where the processor implements the steps of any QoE configuration method for the RRC resume process described above by running the executable instructions.

According to an eighth aspect of embodiments of the present application, provided is a computer-readable storage medium storing computer instructions, where the instructions, when executed by a processor, implements the steps of any QoE configuration method for the RRC resume process described above.

Furthermore, the technical effects brought about by any implementation in the seventh to eighth aspects can refer to the technical effects brought about by different implementations in the first or second or third aspect, and will not be repeated here.

The technical solutions provided by embodiments of the present application at least bring the following beneficial effects.

The present application proposes a QoE configuration method and apparatus for the RRC resume process, to ensure that the network side can notify the terminal to release or store a part of the QoE configuration information during the RRC resume or handover process.

BRIEF DESCRIPTION OF FIGURES

In order to illustrate the technical solutions in embodiments of the present application more clearly, the accompanying figures which need to be used in describing embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION

Figure 1:
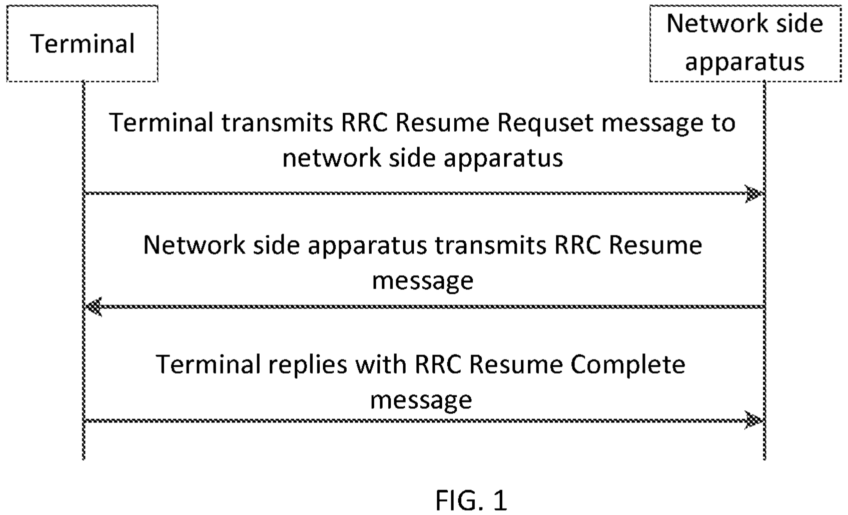
FIG. 1 is a schematic diagram of a successful RRC connection in the related art according to an example.

In order to make the objects, technical solutions and advantages of the present application clearer, the present application will be further illustrated below in details with reference to the accompanying figures. Obviously the described embodiments are merely a part of embodiments of the present application but not all embodiments. Based upon embodiments of the present application, all of other embodiments obtained by those ordinary skilled in the art without creative work pertain to the protection scope of the present application.

Some words that appear herein will be explained below:

1. The term "and/or" in embodiments of the present application describes the association relationship of associated objects, indicating that there may be three relationships, for example, A and/or B may represent: only A, both A and B, and only B. The character "/" generally indicates that the associated objects have a kind of "or" relationship.

2. The terms such as "first", "second", etc. in the specification and claims and the above-mentioned drawings of the present application are used to distinguish the similar objects, but not necessarily to describe a particular order or sequence. It should be understood that the data used in this way is interchangeable under appropriate circumstances, so that the embodiments of the present application described herein can be implemented in an order other than those illustrated or described herein.

3. The term "QoE measurement" in embodiments of the present application designates QoE measurement collection for streaming services in the Universal Terrestrial Radio Access Network (UTRAN) and the evolved access network (E-UTRAN). The NR QoE measurement may not only collect the experience parameters of streaming media services, but also consider typical performance requirements of different service types (such as AR/VR (Augmented Reality/Virtual Reality) and URLLC (Ultra Reliable Low Latency Communication)). The service types that can be supported in the NR include: AR/VR, URLLC, etc. The protocol defines two types of QoE measurements, which are QoE configuration types. One is signalling based case (QoE measurement based on signalling), and the process is as follows: the OAM (Operation Administration Maintenance) transmits the QoE configuration to the CN (Core Network), the CN transmits the QoE configuration to the network side, and the network side forwards the QoE configuration to the terminal, where the configuration aims at a specific terminal; and the other is management based case (QoE measurement based on management), and the process is as follows: the OAM transmits the QoE configuration directly to the network side, and the network side forwards the QoE configuration to the terminal, where the configuration does not aim at a specific terminal or multiple terminals.

The application scenarios described in embodiments of the present application are intended to illustrate the technical solutions of embodiments of the present application more clearly, and do not constitute a limitation on the technical solutions provided in embodiments of the present application. As can be known by those ordinary skilled in the art, with the appearance of new application scenarios, the technical solutions provided in embodiments of the present application are also applicable to similar technical problems. Here, in the description of the present application, "multiple" means two or more unless otherwise specified.

The problems existing in the prior art are as follows.

During the RRC resume process, the terminal may resume/switch to a cell outside the QoE configuration area, or the currently resumed cell is under too heavy load, or the currently resumed cell does not support QoE measurement (QoE configuration is invalid). The current mechanism does not specify what information the resumed cell notifies the terminal to release or store the QoE configuration information based on.

In order to solve the above problem, the present application provides a QoE configuration method and apparatus for the RRC resume process.

FIG. 1 is a schematic diagram of a successful RRC connection in the related art according to an example. The terminal initiates an RRC connection resume process to the network side in the RRC_INACTIVE state. The terminal transmits an RRC ResumeRequset/RRC ResumeRequest1 (RRC resume request) message to the network side apparatus, to request the network side to resume the connection. The network side agrees after receiving the resume request message, and then transmits an RRCResume (RRC resume) message. After receiving the RRC Resume message, the terminal replies with an RRC ResumeComplete (RRC resume complete) message.

In embodiments of the present application, during the RRC resume process of a terminal, a network side apparatus obtains the QoE configuration information of the terminal, determines a first QoE configuration according to the QoE configuration information, and instructs the terminal to release the first QoE configuration; and the terminal receives a release instruction transmitted by the network side apparatus, where the release instruction contains the first QoE configuration; and releases the first QoE configuration according to the release instruction, where the first QoE configuration is QoE configuration that the terminal needs to release.

In embodiments of the present application, a method for QoE configuration during an RRC resume process is provided. Based on the same concept, a QoE configuration apparatus and device for the RRC resume process and a computer-readable storage medium are also provided.

Embodiment 1

Figure 2:
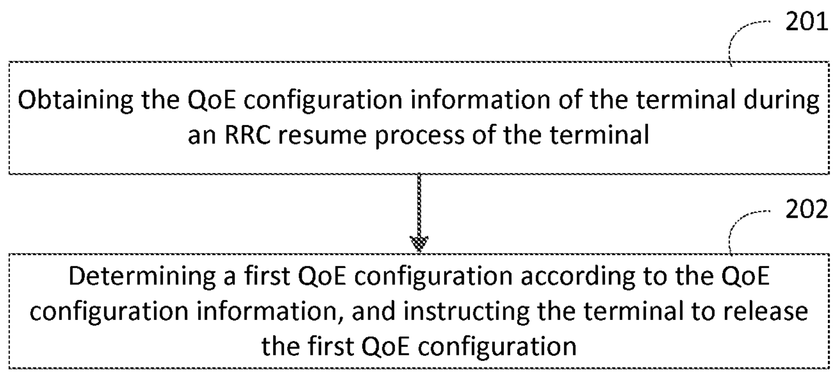
FIG. 2 is a flow chart of a QoE configuration method for an RRC resume process applied to a first network side apparatus according to an exemplary embodiment.

A method for QoE configuration during an RRC resume process provided in the present application will be illustrated below by specific embodiments. This method is applied to a first network side apparatus, which is an apparatus that performs RRC resume connection with the terminal. As shown in FIG. 2, the method includes the following operations.

Step 201: obtaining the QoE configuration information of the terminal during an RRC resume process of the terminal.

The RRC resume process of the terminal is as described above. During the resume process, the first network side apparatus can obtain the QoE configuration information of the terminal in any of the following ways.

The first network side apparatus may obtain the QoE configuration information of the terminal from the terminal/second network side apparatus after receiving an RRC resume request message transmitted by the terminal, where the second network side apparatus is a network side apparatus that configures the QoE configuration for the terminal.

The first network side apparatus may also be the second network side apparatus that configures the QoE configuration for the terminal, and then the first network side apparatus may obtain the QoE configuration information of the terminal from itself.

When the first network side apparatus obtains the QoE configuration information of the terminal from the terminal, the first network side apparatus requests the terminal to report the QoE configuration information by means of an RRC resume message transmitted to the terminal, and receives the QoE configuration information of the terminal transmitted by the terminal by means of an RRC resume complete message.

When the first network side apparatus obtains the QoE configuration information of the terminal from the second network apparatus, the first network side apparatus requests the QoE configuration information of the terminal from the second network side apparatus by means of an interface after receiving the RRC resume request message of the terminal, and the second network side apparatus transmits the QoE configuration information of the terminal to the first network side apparatus by means of the interface after receiving the request message transmitted by the first network side apparatus.

Step 202: determining a first QoE configuration according to the QoE configuration information, and instructing the terminal to release the first QoE configuration.

When the terminal resumes to a cell that supports QoE measurement during the RRC (Radio Resource Control) resume process but this cell is outside the QoE configuration area (the QoE configuration may be invalid), or the currently resumed cell is under too heavy load (the QoE configuration that has not yet enabled measurement does not require QoE measurement), or the resumed cell does not support QoE measurement (QoE configuration is invalid) while it is possible to be unable to fully obtain all QoE configuration information configured for the terminal, the QoE configuration needs to be released. The QoE configuration that needs to be released here may be called the first QoE configuration in the document of the present application. The “first” here does not specifically refer to a certain QoE configuration.

When the first network side apparatus obtains the QoE configuration information of the terminal from the terminal or the second network side apparatus during the RRC resume process, the QoE configuration information may be obtained by using a message in the RRC resume process, or may be obtained by defining a new message, or may be obtained by means of active request, or may be obtained by means of active reporting by the terminal.

In some embodiments, the first network side apparatus may obtain the QoE configuration information of the terminal from the terminal during the RRC resume process in the following ways.

The first network side apparatus receives the RRC resume request message transmitted by the terminal and requests the terminal to transmit the QoE configuration information of the terminal, or the terminal may actively report the QoE configuration information of the terminal.

The QoE configuration information transmitted by the terminal is received. In some embodiments, the RRC resume message carries information requesting the terminal to report the QoE configuration information, and the first network side apparatus receives the QoE configuration information of the terminal transmitted by the terminal by means of the RRC resume complete message.

In some embodiments, the first network side apparatus may obtain the QoE configuration information of the terminal from the second network side apparatus during the RRC resume process in the following ways.

After receiving the RRC resume request message transmitted by the terminal, the first network side apparatus requests the second network side apparatus to transmit the QoE configuration information of the terminal by means of the interface.

The first network side apparatus receives the QoE configuration information of the terminal transmitted by the second network side apparatus by means of the interface after receiving the request.

The QoE configuration information of the terminal obtained by the first network side apparatus may include the QoE configuration with measurement enabled, the QoE configuration without measurement enabled, or the configured QoE configuration, where the configured QoE configuration includes QoE configuration with measurement enabled and QoE configuration without measurement enabled. The first network side apparatus determines the QoE configuration that the terminal needs to release based on its own situation, where the QoE configuration that needs to be released may include the enabled QoE configuration that needs to be released, and may also include the unenabled QoE configuration that needs to be released. Of course, only the unenabled QoE configuration that needs to be released may be included.

In some embodiments, the QoE configuration information includes at least one or more of:

a QoE configuration with measurement enabled; or a QoE configuration without measurement enabled.

The second network side apparatus configures the QoE configuration information (called complete QoE configuration information) for the terminal. The complete QoE configuration information includes a QoE container configured at the APP (Application) layer and QoE parameters configured at the AS layer. In an embodiment of the present application, the QoE configuration information obtained by the first network side apparatus includes at least one of:

the complete first QoE configuration parameter information received from the second network side apparatus, where the terminal transmits the complete first QoE configuration parameter information received from the second network side apparatus to the first network side apparatus when the first network side apparatus obtains the QoE configuration information from the terminal, and the first network side apparatus receives the complete first QoE configuration parameter information transmitted by the second network side from the second network side apparatus when the first network side apparatus obtains the QoE configuration information from the second network side apparatus; and the second QoE configuration parameter only visible to the AS layer, where the terminal transmits the second QoE configuration parameter visible to the AS layer to the first network side apparatus when the first network side apparatus obtains the QoE configuration information from the terminal, and the first network side apparatus receives the second QoE configuration parameter visible to the AS layer transmitted by the second network side apparatus from the second network side apparatus when the first network side apparatus obtains the QoE configuration information from the second network side apparatus.

In some embodiments, the second QoE configuration parameter information includes at least one of:

1) at least one of: a service type corresponding to QoE configuration/identification information of QoE configuration/a priority of the service type corresponding to QoE configuration/a priority of the identification information of QoE configuration/a QoE configuration type/a cache state of QoE configuration/a playing delay of QoE configuration;
2) at least one of: a service type corresponding to a QoE configuration type based on signalling/identification information of QoE configuration based on signalling/a priority of the service type based on signalling/a priority of the identification information of QoE configuration based on signalling/a priority of the QoE configuration type based on signalling/a cache state of QoE configuration based on signalling/a playing delay of QoE configuration based on signalling; and
3) at least one of: a service type corresponding to a QoE configuration type based on management/identification information of QoE configuration based on management/a priority of the service type based on management/a priority of the identification information of QoE configuration based on management/a priority of the QoE configuration type based on management/a cache state of QoE configuration based on management/a playing delay of QoE configuration based on management.

The service type corresponding to QoE configuration includes AR/VR, URLLC, streaming, etc., and is used to indicate the service type corresponding to the current QoE configuration, and then the first network side apparatus can determine a QoE configuration according to the service type corresponding to QoE configuration; the identification information of QoE configuration is used to identify the configured QoE configuration, and a unique QoE configuration is determined from each identification, and then the first network side apparatus can determine a corresponding QoE configuration according to the identification information of QoE configuration; the priority of the service type corresponding to QoE configuration is used to indicate the priority of the service type corresponding to the current QoE configuration, and then the first network side apparatus can determine a corresponding QoE configuration according to the priority of the service type corresponding to QoE configuration; the priority of the identification information of QoE configuration is used to instruct the first network side apparatus to determine a QoE configuration that satisfies the priority of the identification information of QoE configuration; the QoE configuration type is used to indicate whether the current QoE configuration is a signalling-based QoE configuration type or a management-based QoE configuration type, and then the first network side apparatus can determine a corresponding QoE configuration according to the QoE configuration type; the cache state of QoE configuration is used to instruct the first network side apparatus to determine a QoE configuration with the same cache state of QoE configuration; and the playing delay of QoE configuration is used to instruct the first network side apparatus to determine a QoE configuration with the same playing delay of QoE configuration.

The priority of the QoE configuration type in the QoE configuration based on signalling is its own priority, and the priority of the QoE configuration type in the QoE configuration based on management is its own priority.

In some embodiments, the first QoE configuration may be determined according to the QoE configuration information, including at least one of the following steps:

determining a service type of the first QoE configuration according to the QoE configuration information, where the service type includes AR/VR, URLLC, streaming, etc.;

determining identification information of the first QoE configuration according to the QoE configuration information;

determining a priority of the service type of the first QoE configuration according to the QoE configuration information;

determining a priority of the identification information of the first QoE configuration according to the QoE configuration information; or determining whether the first QoE configuration type is a signalling-based QoE configuration type or a management-based QoE configuration type according to the QoE configuration information.

The embodiment of the present application can ensure that the network side can notify the terminal to release/store a part of the QoE configuration information during the RRC resume/handover process.

Figure 3:
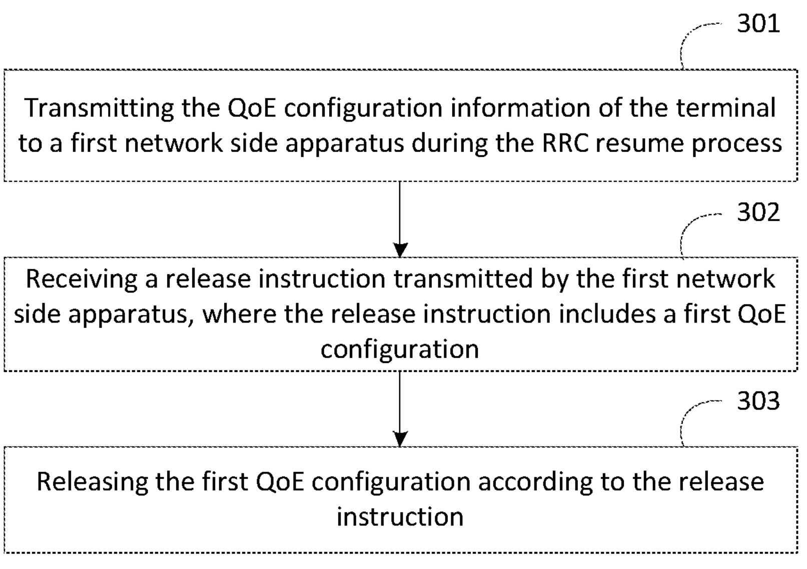
FIG. 3 is a flow chart of a QoE configuration method for an RRC resume process applied to a terminal according to an exemplary embodiment.

Embodiments of the present application provide a method for QoE configuration during an RRC resume process, applied to a terminal. As shown in FIG. 3, the method includes the following operations.

Step 301: transmitting the QoE configuration information of the terminal to a first network side apparatus during the RRC resume process.

The first network side apparatus refers to an apparatus that performs RRC resume connection with the terminal.

The terminal can autonomously report its own QoE configuration information, or can report the QoE configuration information of the terminal according to the request obtained by the terminal.

In some embodiments, the QoE configuration information includes at least one or more of:

a QoE configuration with measurement enabled; or a QoE configuration without measurement enabled.

In some embodiments, the QoE configuration includes at least one of:

complete first QoE configuration parameter information received from a second network side apparatus; or second QoE configuration parameter information only visible to an AS.

In some embodiments, the second QoE configuration parameter information includes at least one of:

1) at least one of: a service type corresponding to QoE configuration/identification information of QoE configuration/a priority of the service type corresponding to QoE configuration/a priority of the identification information of QoE configuration/a QoE configuration type/a cache state of QoE configuration/a playing delay of QoE configuration;
2) at least one of: a service type corresponding to a QoE configuration type based on signalling/identification information of QoE configuration based on signalling/a priority of the service type based on signalling/a priority of the identification information of QoE configuration based on signalling/a priority of the QoE configuration type based on signalling/a cache state of QoE configuration based on signalling/a playing delay of QoE configuration based on signalling; and
3) at least one of: a service type corresponding to a QoE configuration type based on management/identification information of QoE configuration based on management/a priority of the service type based on management/a priority of the identification information of QoE configuration based on management/a priority of the QoE configuration type/a cache state of QoE configuration based on management/a playing delay of QoE configuration based on management.

The service type corresponding to QoE configuration includes AR/VR, URLLC, streaming, etc., and is used to indicate the service type corresponding to the current QoE configuration of the terminal; the identification information of QoE configuration is used to identify the QoE configuration configured by the terminal, and a unique QoE configuration is determined from each identification; the priority of the service type corresponding to QoE configuration is used to indicate the priority of the service type corresponding to the current QoE configuration of the terminal; the priority of the identification information of QoE configuration is used to indicate the priority of the identification information of the current QoE configuration of the terminal; the QoE configuration type is used to indicate whether the current QoE configuration of the terminal is a signalling-based QoE configuration type or a management-based QoE configuration type; the cache state of QoE configuration is used to indicate the cache state of the current QoE configuration of the terminal; and the playing delay of QoE configuration is used to indicate the playing delay of the current QoE configuration of the terminal.

The priority of the QoE configuration type in the QoE configuration based on signalling is its own priority, and the priority of the QoE configuration type in the QoE configuration based on management is its own priority.

Step 302: receiving a release instruction transmitted by the first network side apparatus, where the release instruction includes a first QoE configuration.

Step 303: releasing the first QoE configuration according to the release instruction.

In some embodiments, the releasing the first QoE configuration according to the release instruction includes at least one of the following operations:

releasing, according to a service type of the first QoE configuration in the release instruction, a QoE configuration corresponding to the service type;

releasing, according to identification information of the first QoE configuration in the release instruction, a QoE configuration corresponding to the identification information;

releasing, according to a priority of the service type of the first QoE configuration in the release instruction, a QoE configuration corresponding to the priority of the service type;

releasing, according to a priority of the identification information of the first QoE configuration in the release instruction, a QoE configuration corresponding to the priority of the identification information; or releasing, according to whether the first QoE configuration type is a signalling-based QoE configuration type or a management-based QoE configuration type in the release instruction, a QoE configuration corresponding to the configuration type.

Figure 4:
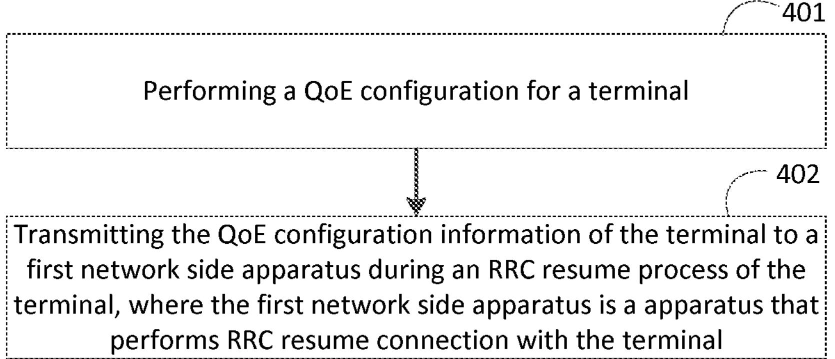
FIG. 4 is a flow chart of a QoE configuration method for an RRC resume process applied to a second network side apparatus according to an exemplary embodiment.

Embodiments of the present application provide a method for QoE configuration during an RRC resume process, applied to a second network side apparatus. As shown in FIG. 4, the method includes the following steps.

Step 401: performing a QoE configuration for a terminal.

Step 402: transmitting the QoE configuration information of the terminal to a first network side apparatus during the RRC resume process of the terminal, where the first network side apparatus is an apparatus that performs RRC resume connection with the terminal.

In some embodiments, the QoE configuration information includes at least one or more of:

a QoE configuration with measurement enabled; or a QoE configuration without measurement enabled.

In some embodiments, the QoE configuration includes at least one of:

complete first QoE configuration parameter information; or second QoE configuration parameter information only visible to an AS.

In some embodiments, the second QoE configuration parameter information includes at least one of:

1) at least one of: a service type corresponding to QoE configuration/identification information of QoE configuration/a priority of the service type corresponding to QoE configuration/a priority of the identification information of QoE configuration/a QoE configuration type/a cache state of QoE configuration/a playing delay of QoE configuration;
2) at least one of: a service type corresponding to a QoE configuration type based on signalling/identification information of QoE configuration based on signalling/a priority of the service type based on signalling/a priority of the identification information of QoE configuration based on signalling/a priority of the QoE configuration type based on signalling/a cache state of QoE configuration based on signalling/a playing delay of QoE configuration based on signalling; and
3) at least one of: a service type corresponding to a QoE configuration type based on management/identification information of QoE configuration based on management/a priority of the service type based on management/a priority of the identification information of QoE configuration based on management/a priority of the QoE configuration type based on management/a cache state of QoE configuration based on management/a playing delay of QoE configuration based on management.

Some embodiments of the QoE configuration during the RRC resume process will be given below.

Example 1

The following is a detailed process for the terminal to directly report the QoE configuration information without request from the first network side apparatus during the RRC resume process, including the following steps.

Step 1: The second network side apparatus receives the QoE configuration information transmitted by the TCE (Trace Collection Entity) or the core network, and the second network side apparatus adds a service type parameter and the QoE configuration identification information or other content to the QoE configuration information and forwards the QoE configuration information to the terminal.

Step 2: After receiving the QoE configuration information, the terminal performs the QoE measurement on the QoE configuration corresponding to the service type/QoE configuration identification information according to the QoE configuration information, where there may be some QoE configurations without measurement enabled.

Step 3: The second network side apparatus decides to release the terminal to the INACTIVE state, and the terminal receives an RRC Release message transmitted by the second network side apparatus and enters the RRC_INACTIVE state.

Step 4: The terminal saves the QoE configuration information in the RRC_INACTIVE state, including the QoE configuration with measurement enabled and the QoE configuration without measurement enabled in the RRC connection state.

Step 5: The terminal needs to enter the connection state for data transmission, so the terminal transmits an RRC Resume Request message to the first network side apparatus, where the RRC Resume Request message contains the QoE configuration identification information with QoE measurement enabled and the QoE configuration information without QoE measurement enabled, and is used to notify the first network side apparatus of the QoE configuration with QoE measurement enabled and the configured QoE configuration, to prevent the first network side apparatus from releasing the QoE configuration with QoE measurement enabled.

Step 6: After receiving the RRC Resume Request message, the first network side apparatus carries the identification information of the first QoE configuration of the terminal in an RRC Resume message according to the loading condition.

Step 7: The terminal receives the RRC Resume message transmitted by the first network side apparatus, releases the corresponding QoE configuration according to the QoE configuration identification information in the RRC Resume message, and transmits an RRC Resume Complete message to the first network side apparatus to complete the RRC resume process.

Example 2

The specific steps for the terminal to report the QoE configuration information according to the request from the first network side apparatus are as follows.

Steps 1 to 4 are the same as step 1 to 4 in Example 1, but the RRC Resume Request message transmitted by the terminal to the first network side apparatus does not include the QoE configuration information.

Step 5: After receiving the RRC Resume Request message, the first network side apparatus transmits an RRC Resume message to the terminal, where the RRC Resume message contains a request for the terminal to report the QoE configuration with measurement enabled.

Step 6: After receiving the RRC Resume message transmitted by the first network side apparatus, the terminal carries the QoE configuration with measurement enabled in an RRC Resume Complete message, and notifies the first network side apparatus by means of the QoE configuration parameter information visible to the AS layer, where the parameters visible to the AS layer include: the service type corresponding to the QoE configuration/the identification information of the QoE configuration/the priority of the service type corresponding to the QoE configuration/the priority of the identification information of the QoE configuration/the QoE configuration type/the cache state of the QoE configuration/the playing delay of the QoE configuration; or the RRC Resume Complete message may contain the complete QoE configuration information, that is, the complete QoE configuration information (including a QoE container configured at the APP layer and QoE parameters configured at the AS layer) received from the second network side apparatus.

Step 7: After receiving the RRC Resume Complete message transmitted by the terminal, the first network side apparatus notifies the terminal of the identification information of the first QoE configuration in an RRC Reconfiguration message according to the received QoE configuration information.

Step 8: After receiving the RRC Reconfiguration message, the terminal releases the corresponding QoE configuration according to the QoE configuration identification information.

Example 3

The following is an implementation in which the first network side apparatus transfers the QoE configuration information between interfaces or the first network side apparatus obtains the QoE configuration information by itself and the terminal releases by itself. The steps are as follows.

Step 1: The second network side apparatus receives the QoE configuration information transmitted by the TCE or the core network, and the second network side apparatus adds a service type parameter and the QoE configuration identification information or other content to the QoE configuration information and forwards the QoE configuration information to the terminal.

Step 2: After receiving the QoE configuration information, the terminal performs the QoE measurement on the QoE configuration corresponding to the service type/QoE configuration identification information according to the QoE configuration information, where there may be some QoE configurations without measurement enabled, and the terminal notifies the second network side apparatus of the QoE configuration with measurement enabled by means of uplink RRC signalling for the QoE configuration with measurement enabled.

Step 3: The second network side apparatus decides to release the terminal to the INACTIVE state, and the terminal receives an RRC Release message transmitted by the second network side apparatus and enters the RRC_INACTIVE state.

Step 4: The terminal saves the QoE configuration information in the RRC_INACTIVE state, including the QoE configuration with measurement enabled and the QoE configuration without measurement enabled in the RRC connection state.

Step 5: The terminal transmits an RRC Resume Request message to the first network side apparatus, the first network side apparatus requests the context information of the terminal from other second network side apparatus by means of an interface after receiving the RRC Resume Request message from the terminal, and the second network side apparatus receives the request message transmitted by the first network side apparatus, where the context information of the terminal transferred by means of the interface includes the QoE configuration information and the QoE measurement area of the terminal, such as the QoE configuration with measurement enabled at the terminal and the QoE configuration without measurement enabled. Furthermore, if the first network side apparatus and the second network side apparatus are the same network side apparatus, then the first network side apparatus obtains the QoE configuration previously configured for the terminal from itself after receiving the RRC Resume Request message from the terminal.

Step 6: The first network side apparatus finds that it is not within the QoE measurement area, and notifies the terminal to release the QoE configuration identification information in an RRC Resume message after receiving the RRC Resume Request message.

Step 7: The terminal receives the RRC Resume message transmitted by the first network side apparatus, and releases the corresponding QoE configuration according to the QoE configuration identification information in the RRC Resume message. If the first QoE configuration transmitted by the first network side apparatus includes the QoE configuration with measurement enabled, there is only a need to release the QoE configuration without measurement enabled.

Step 8: The terminal transmits an RRC Resume Complete message, where the RRC Resume Complete message contains the identification information of the QoE configuration that is not released in Step 7, to notify the first network side apparatus of the QoE configuration that is not released, and complete the RRC resume process.

Embodiment 2

Based on the same inventive concept, embodiments of the present application further provide an apparatus for QoE configuration during an RRC resume process, applied to the first network side apparatus. Since this apparatus is the apparatus in the method in the embodiments of the present application and the principle of this apparatus to solve the problem is similar to that of the method, the implementations of this apparatus can refer to the implementations of the method, and the repeated description thereof will be omitted.

Figure 5:
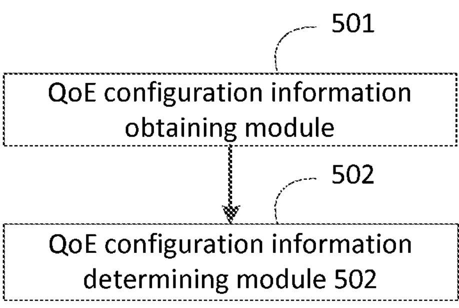
FIG. 5 is a schematic diagram of a module structure of a QoE configuration apparatus for an RRC resume process applied to the first network side apparatus according to an exemplary embodiment.

As shown in FIG. 5, the above apparatus includes the following modules:

- a QoE configuration information obtaining module 501 configured to obtain QoE configuration information of a terminal during an RRC resume process of the terminal by means of the first network side apparatus; and
- a QoE configuration information determining module 502 configured to determine a first QoE configuration according to the QoE configuration information and instruct the terminal to release the first QoE configuration by means of the first network side apparatus.

In some embodiments, the QoE configuration information includes at least one or more of:

- a QoE configuration with measurement enabled; or
- a QoE configuration without measurement enabled.

In some embodiments, the obtaining the QoE configuration information of the terminal during the RRC resume process of the terminal, includes:

- receiving an RRC resume request message transmitted by the terminal; and
- obtaining the QoE configuration information of the terminal from the terminal/a second network side apparatus, where the second network side apparatus is a network side apparatus that configures QoE configuration for the terminal.

In some embodiments, the QoE configuration information obtaining module is configured to obtain the QoE configuration information of the terminal from the terminal/second network side apparatus by means of the first network side apparatus, including:

- transmitting a QoE configuration information request to the terminal/second network side apparatus; and
- receiving the QoE configuration information transmitted by the terminal/second network side apparatus according to the QoE configuration information request.

In some embodiments, the QoE configuration information includes at least one of:

- complete first QoE configuration parameter information received from a second network side apparatus; or
- second QoE configuration parameter information only visible to an AS.

In some embodiments, the second QoE configuration parameter information includes at least one of:

- at least one of: a service type corresponding to QoE configuration/identification information of QoE configuration/a priority of the service type corresponding to QoE configuration/a priority of the identification information of QoE configuration/a QoE configuration type/a cache state of QoE configuration/a playing delay of QoE configuration;
- at least one of: a service type corresponding to a QoE configuration type based on signalling/identification information of QoE configuration based on signalling/a priority of the service type based on signalling/a priority of the identification information of QoE configuration based on signalling/a priority of the QoE configuration type based on signalling/a cache state of QoE configuration based on signalling/a playing delay of QoE configuration based on signalling; and
- at least one of: a service type corresponding to a QoE configuration type based on management/identification information of QoE configuration based on management/a priority of the service type based on management/a priority of the identification information of QoE configuration based on management/a priority of the QoE configuration type based on management/a cache state of QoE configuration based on management/a playing delay of QoE configuration based on management.

In some embodiments, the QoE configuration information determining module is configured to determine the first QoE configuration according to the QoE configuration information by means of the first network side apparatus, including at least one of the following steps:

- determining a service type of the first QoE configuration according to the QoE configuration information;
- determining identification information of the first QoE configuration according to the QoE configuration information;
- determining a priority of the service type of the first QoE configuration according to the QoE configuration information;
- determining a priority of the identification information of the first QoE configuration according to the QoE configuration information; or
- determining a first QoE configuration type according to the QoE configuration information.

Figure 6:
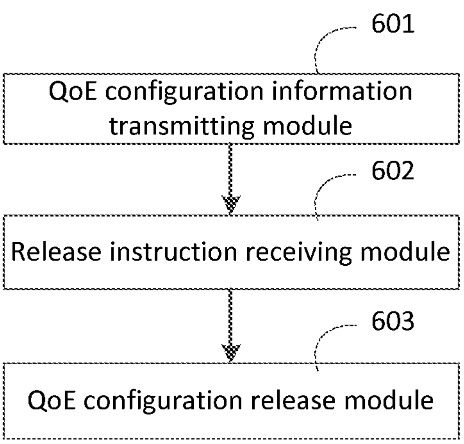
FIG. 6 is a schematic diagram of a module structure of a QoE configuration apparatus for an RRC resume process applied to the terminal according to an exemplary embodiment.

Embodiments of the present application further provide an apparatus for QoE configuration during an RRC resume process, applied to a terminal. As shown in FIG. 6, the apparatus includes:

- a QoE configuration information transmitting module 601 configured to transmit QoE configuration information of the terminal to a first network side apparatus during the RRC resume process by means of the terminal;
- a release instruction receiving module 602 configured to receive a release instruction transmitted by the first network side apparatus by means of the terminal, where the release instruction includes a first QoE configuration; and
- a QoE configuration release module 603 configured to release the first QoE configuration according to the release instruction by means of the terminal.

In some embodiments, the QoE configuration release module 603 is configured to release the first QoE configuration according to the release instruction by means of the terminal, including at least one of the following steps:

- releasing, according to a service type of the first QoE configuration in the release instruction, a QoE configuration corresponding to the service type;
- releasing, according to identification information of the first QoE configuration in the release instruction, a QoE configuration corresponding to the identification information;
- releasing, according to a priority of the service type of the first QoE configuration in the release instruction, a QoE configuration corresponding to the priority of the service type;
- releasing, according to a priority of the identification information of the first QoE configuration in the release instruction, a QoE configuration corresponding to the priority of the identification information; or
- releasing, according to a first QoE configuration type in the release instruction, a QoE configuration corresponding to the configuration type.

Figure 7:
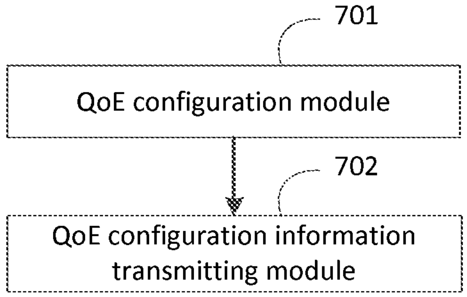
FIG. 7 is a schematic diagram of a module structure of a QoE configuration apparatus for an RRC resume process applied to the second network side apparatus according to an exemplary embodiment.

Embodiments of the present application further provide an apparatus for QoE configuration during an RRC resume process, applied to a second network side apparatus. As shown in FIG. 7, the apparatus includes:

- a QoE configuration module 701 configured to perform a QoE configuration for a terminal by means of the second network side apparatus; and
- a QoE configuration information transmitting module 702 configured to transmit QoE configuration information of the terminal to a first network side apparatus during an RRC resume process of the terminal by means of the second network side apparatus, where the first network side apparatus is an apparatus that performs RRC resume connection with the terminal.

Embodiment 3

Based on the same inventive concept, embodiments of the present application further provide an apparatus for QoE configuration during an RRC resume process. Since this apparatus is an apparatus in the method in the embodiments of the present application and the principle of this apparatus to solve the problem is similar to that of the method, the implementations of this apparatus can refer to the implementations of the method, and the repeated description thereof will be omitted.

An apparatus 80 according to this embodiment of the present application will be described below with reference to FIG. 8. The apparatus 80 shown in FIG. 8 is only one example, and should not bring any limitation to the functions and usage scope of embodiments of the present application.

Figure 8:
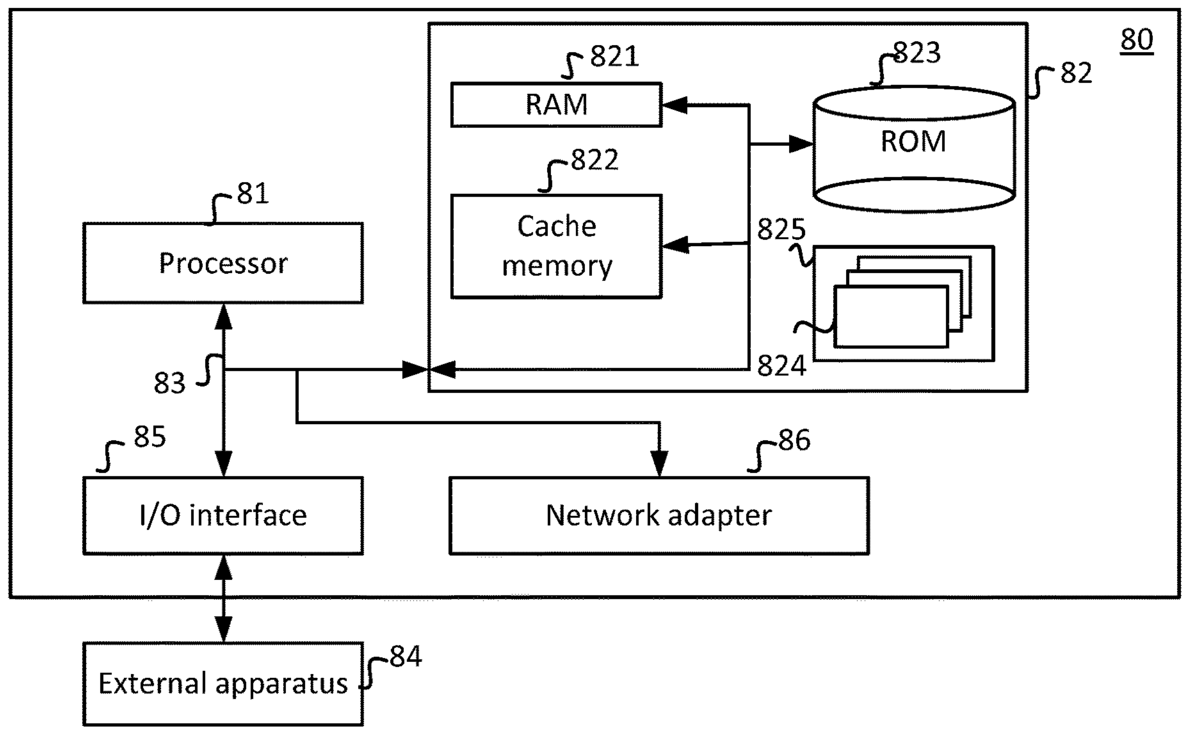
FIG. 8 is a schematic diagram of an electronic apparatus of the QoE configuration method for the RRC resume process applied to the first network side apparatus according to an exemplary embodiment.

As shown in FIG. 8, the apparatus 80 may be in the form of a general-purpose computing apparatus, and for example, may be a terminal apparatus. The components of the apparatus 80 may include, but are not limited to: at least one processor 81 described above, at least one memory 82 storing processor executable instructions described above, and a bus 83 connecting different system components (including the memory 82 and the processor 81).

The processor executes the executable instructions to implement the following steps:

- obtaining QoE configuration information of a terminal during an RRC resume process of the terminal; and
- determining a first QoE configuration according to the QoE configuration information, and instructing the terminal to release the first QoE configuration.

In some embodiments, the QoE configuration information includes at least one or more of:

- a QoE configuration with measurement enabled; or
- a QoE configuration without measurement enabled.

In some embodiments, the obtaining the QoE configuration information of the terminal during the RRC resume process of the terminal, includes:

- receiving an RRC resume request message transmitted by the terminal; and
- obtaining the QoE configuration information of the terminal from the terminal/a second network side apparatus, where the second network side apparatus is a network side apparatus that configures QoE configuration for the terminal.

In some embodiments, the obtaining the QoE configuration information of the terminal from the terminal/second network side apparatus, includes:

- transmitting a QoE configuration information request to the terminal/second network side apparatus; and
- receiving the QoE configuration information transmitted by the terminal/second network side apparatus according to the QoE configuration information request.

In some embodiments, the QoE configuration information includes at least one of:

- complete first QoE configuration parameter information received from a second network side apparatus; or
- second QoE configuration parameter information only visible to an AS.

In some embodiments, the second QoE configuration parameter information includes at least one of:

at least one of: a service type corresponding to QoE configuration/identification information of QoE configuration/a priority of the service type corresponding to QoE configuration/a priority of the identification information of QoE configuration/a QoE configuration type/a cache state of QoE configuration/a playing delay of QoE configuration;

- at least one of: a service type corresponding to a QoE configuration type based on signalling/identification information of QoE configuration based on signalling/a priority of the service type based on signalling/a priority of the identification information of QoE configuration based on signalling/a priority of the QoE configuration type based on signalling/a cache state of QoE configuration based on signalling/a playing delay of QoE configuration based on signalling; and
- at least one of: a service type corresponding to a QoE configuration type based on management/identification information of QoE configuration based on management/a priority of the service type based on management/a priority of the identification information of QoE configuration based on management/a priority of the QoE configuration type based on management/a cache state of QoE configuration based on management/a playing delay of QoE configuration based on management.

In some embodiments, the processor determines the first QoE configuration according to the QoE configuration information, including at least one of the following steps: determining a service type of the first QoE configuration according to the QoE configuration information;

determining identification information of the first QoE configuration according to the QoE configuration information;

determining a priority of the service type of the first QoE configuration according to the QoE configuration information;

determining a priority of the identification information of the first QoE configuration according to the QoE configuration information; or determining a first QoE configuration type according to the QoE configuration information.

The bus 83 represents one or more of several types of bus structures, including a memory bus or a memory controller, a peripheral bus, a processor, or a local bus using any of multiple bus structures.

The memory 82 may include a readable medium in the form of volatile memory, such as a Random Access Memory (RAM) 821 and/or a cache memory 822, and may further include a Read Only Memory (ROM) 823.

The memory 82 may also include a program/utility tool 825 having a set of (at least one) program modules 842. Such program module 842 includes but not limited to: operating system, one or more application programs, other program modules and program data. Each or a combination of these examples may include the realization of a network environment.

The apparatus 80 may also communicate with one or more external apparatuses 84 (such as keyboard, pointing apparatus, etc.), and may also communicate with one or more apparatuses that enable users to interact with the apparatus 80, and/or communicate with any apparatus (such as router, modem, etc.) that enables the electronic apparatus 80 to communicate with one or more other computing apparatuses. Such communication may be performed by means of an input/output (I/O) interface 85. Also, the apparatus 80 may also communicate with one or more networks (for example, Local Area Network (LAN), Wide Area Network (WAN) and/or public network such as Internet) by means of a network adapter 86. As shown, the network adapter 86 communicates with other modules of the electronic apparatus 80 via the bus 83. It should be understood that, although not shown in the figure, other hardware and/or software modules can be used in conjunction with the electronic apparatus 80, including but not limited to: microcode, apparatus driver, redundant processing unit, external disk drive array, RAID system, tape drive, and data backup storage system, etc.

An apparatus 90 according to this embodiment of the present application will be described below with reference to FIG. 9. The apparatus 90 shown in FIG. 9 is only one example, and should not bring any limitation to the functions and usage scope of the embodiments of the present application.

Figure 9:
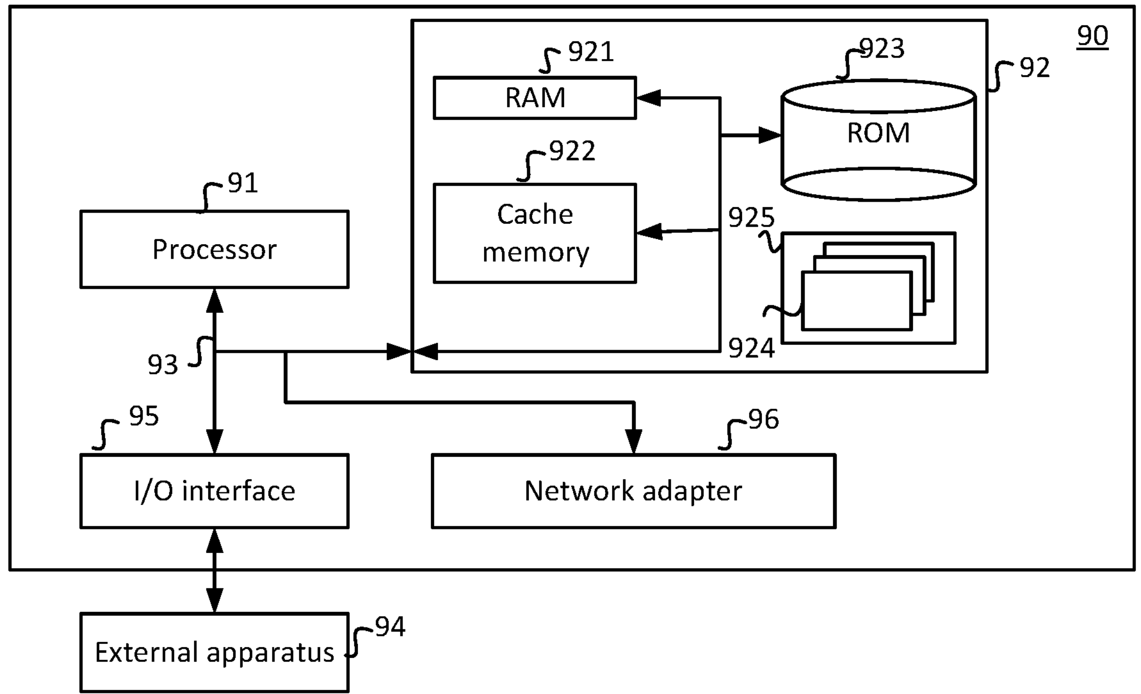
FIG. 9 is a schematic diagram of an electronic apparatus of the QoE configuration method for the RRC resume process applied to the terminal according to an exemplary embodiment.

As shown in FIG. 9, the apparatus 90 may be in the form of a general-purpose computing apparatus, and for example, may be a terminal apparatus. The components of the apparatus 90 may include, but are not limited to: at least one processor 91 described above, at least one memory 92 storing processor executable instructions described above, and a bus 93 connecting different system components (including the memory 92 and the processor 91).

The processor executes the executable instructions to implement the following steps:

transmitting QoE configuration information of the terminal to a first network side apparatus during the RRC resume process;

receiving a release instruction transmitted by the first network side apparatus, where the release instruction includes a first QoE configuration; and releasing the first QoE configuration according to the release instruction.

In some embodiments, releasing the first QoE configuration according to the release instruction, includes at least one of:

releasing, according to a service type of the first QoE configuration in the release instruction, a QoE configuration corresponding to the service type;

releasing, according to identification information of the first QoE configuration in the release instruction, a QoE configuration corresponding to the identification information;

releasing, according to a priority of the service type of the first QoE configuration in the release instruction, a QoE configuration corresponding to the priority of the service type;

releasing, according to a priority of the identification information of the first QoE configuration in the release instruction, a QoE configuration corresponding to the priority of the identification information; or releasing, according to a first QoE configuration type in the release instruction, a QoE configuration corresponding to the configuration type.

The bus 93 represents one or more of several types of bus structures, including a memory bus or a memory controller, a peripheral bus, a processor, or a local bus using any of multiple bus structures.

The memory 92 may include a readable medium in the form of volatile memory, such as a Random Access Memory (RAM) 921 and/or a cache memory 922, and may further include a Read Only Memory (ROM) 923.

The memory 92 may also include a program/utility tool 925 having a set of (at least one) program modules 942. Such program module 942 includes but not limited to: operating system, one or more application programs, other program modules and program data. Each or a combination of these examples may include the realization of a network environment.

The apparatus 90 may also communicate with one or more external apparatuses 94 (such as keyboard, pointing apparatus, etc.), and may also communicate with one or more apparatuses that enable users to interact with the apparatus 90, and/or communicate with any apparatus (such as router, modem, etc.) that enables the apparatus 90 to communicate with one or more other computing apparatuses. Such communication may be performed by means of an input/output (I/O) interface 95. Also, the apparatus 90 may also communicate with one or more networks (for example, Local Area Network (LAN), Wide Area Network (WAN) and/or public network such as Internet) by means of a network adapter 96. As shown, the network adapter 96 communicates with other modules of the apparatus 90 via the bus 93. It should be understood that, although not shown in the figure, other hardware and/or software modules can be used in conjunction with the apparatus 90, including but not limited to: microcode, apparatus driver, redundant processing unit, external disk drive array, RAID system, tape drive, and data backup storage system, etc.

An apparatus 100 according to this embodiment of the present application will be described below with reference to FIG. 10. The apparatus 100 shown in FIG. 10 is only one example, and should not bring any limitation to the functions and usage scope of the embodiments of the present application.

Figure 10:
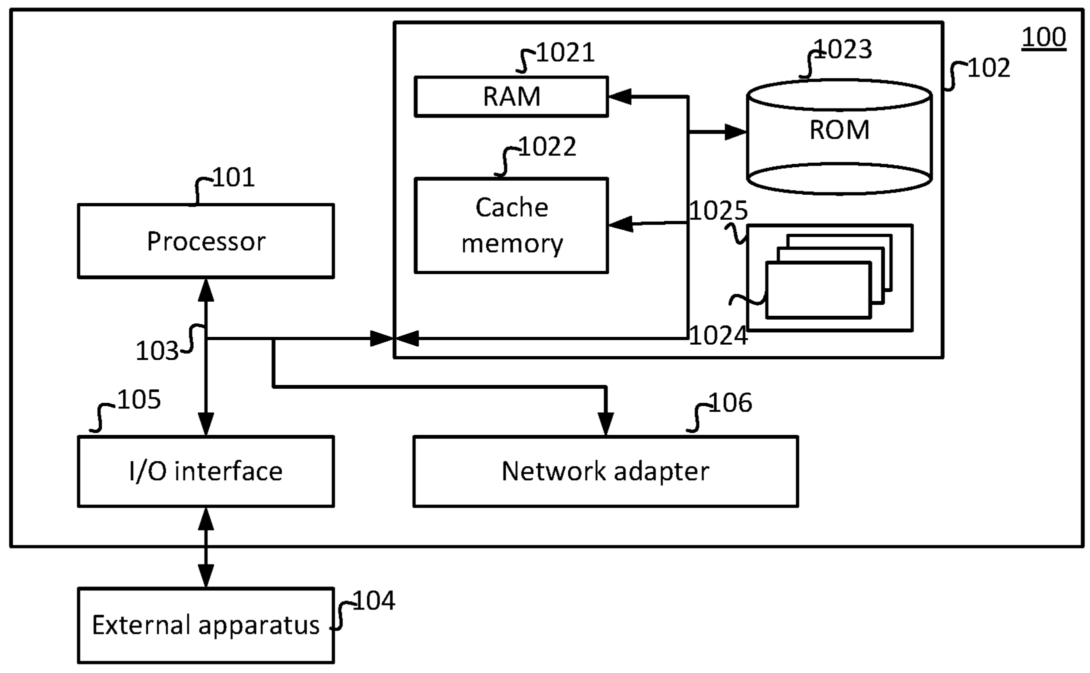
FIG. 10 is a schematic diagram of an electronic apparatus of the QoE configuration method for the RRC resume process applied to the second network side apparatus according to an exemplary embodiment.

As shown in FIG. 10, the apparatus 100 may be in the form of a general-purpose computing apparatus, and for example, may be a terminal apparatus. The components of the apparatus 100 may include, but are not limited to: at least one processor 101 described above, at least one memory 102 storing processor executable instructions described above, and a bus 103 connecting different system components (including the memory 102 and the processor 101).

The processor executes the executable instructions to implement the following steps:

performing a QoE configuration for a terminal; and transmitting QoE configuration information of the terminal to a first network side apparatus during an RRC resume process of the terminal, where the first network side apparatus is an apparatus that performs RRC resume connection with the terminal.

The bus 103 represents one or more of several types of bus structures, including a memory bus or a memory controller, a peripheral bus, a processor, or a local bus using any of multiple bus structures.

The memory 102 may include a readable medium in the form of volatile memory, such as a Random Access Memory (RAM) 1021 and/or a cache memory 1022, and may further include a Read Only Memory (ROM) 1023.

The memory 102 may also include a program/utility tool 1025 having a set of (at least one) program modules 1042. Such program module 1042 includes but not limited to: operating system, one or more application programs, other program modules and program data. Each or a combination of these examples may include the realization of a network environment.

The apparatus 100 may also communicate with one or more external apparatuses 104 (such as keyboard, pointing apparatus, etc.), and may also communicate with one or more apparatuses that enable users to interact with the apparatus 100, and/or communicate with any apparatus (such as router, modem, etc.) that enables the apparatus 100 to communicate with one or more other computing apparatuses. Such communication may be performed by means of an input/output (I/O) interface 105. Also, the apparatus 100 may also communicate with one or more networks (for example, Local Area Network (LAN), Wide Area Network (WAN) and/or public network such as Internet) by means of a network adapter 106. As shown, the network adapter 106 communicates with other modules of the apparatus 100 via the bus 103. It should be understood that, although not shown in the figure, other hardware and/or software modules can be used in conjunction with the apparatus 100, including but not limited to: microcode, apparatus driver, redundant processing unit, external disk drive array, RAID system, tape drive, and data backup storage system, etc.

Embodiment 4

In some possible implementations, various aspects of the present application may also be implemented in the form of a program product, which includes program codes. When the program product runs on a terminal apparatus, the program codes are configured to cause the terminal apparatus to perform the steps of the modules in any QoE configuration apparatus for the RRC resume process according to various exemplary embodiments of the present application described in the above-mentioned section "Exemplary Methods" of this specification, for example, the operations of obtaining the QoE configuration information of the terminal during the RRC resume process of the terminal; determining the first QoE configuration according to the QoE configuration information, and instructing the terminal to release the first QoE configuration, etc.

The program product may use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage medium (non-exhaustive list) include: electrical connection with one or more wires, portable disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof.

Figure 11:
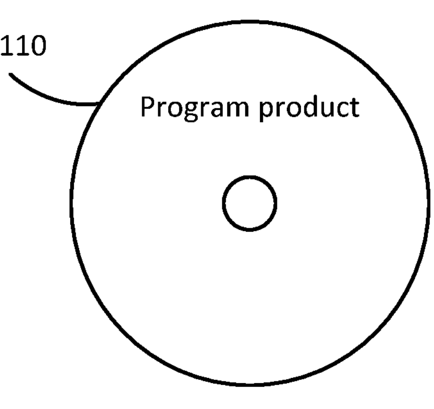
FIG. 11 is a schematic diagram of a program product of the QoE configuration method for the RRC resume process according to an exemplary embodiment.

As shown in FIG. 11, a program product 110 for QoE configuration of the RRC resume process according to an embodiment of the present application is described, and this program product may adopt a portable Compact Disk-Read Only Memory (CD-ROM) and include program codes, and may be run on a terminal apparatus such as personal computer. However, the program product of the present application is not limited to this. In this document, the readable storage medium can be any tangible medium that contains or stores a program, where the program can be used by or used in combination with the instruction execution system, apparatus or device.

The readable signal medium may include data signals propagated in the baseband or as a part of carrier waves, and the readable program codes are beared therein. Such propagated data signals can be in many forms, including but not limited to electromagnetic signals, optical signals, or any suitable combination thereof. The readable signal medium may also be any readable medium other than the readable storage medium, and the readable medium may transmit, propagate or transmit the programs used by or used in combination with the instruction execution system, apparatus or device.

The program codes contained on the readable medium can be transmitted by any suitable medium, including but not limited to wireless, wired, optical cable, RF, etc., or any suitable combination thereof.

The program codes for performing the operations of the present application can be compiled in any combination of one or more programming languages, where the programming languages include the object-oriented programming languages such as Java, C++, etc., and also include the conventional procedural programming languages such as "C" language or similar programming languages. The program codes can be executed entirely on a user computing device, executed partly on a user computing device, executed as an independent software package, executed partly on a user computing device and partly on a remote computing device, or executed entirely on a remote computing device or server. In the case of a remote computing device, the remote computing device can be connected to the user computing device through any kind of network including Local Area Network (LAN) or Wide Area Network (WAN), or can be connected to an external computing device (for example, using the Internet service provider to connect via the Internet).

It should be noted that several modules or sub-modules of the system are mentioned in the above detailed description, but such division is only exemplary and not mandatory. In fact, according to the embodiments of the present application, the features and functions of two or more modules described above may be embodied in one module. Conversely, the features and functions of one module described above may be further divided into multiple modules to be embodied.

In addition, although the operations of various modules of the system of the present application are described in a specific order in the drawings, this does not require or imply that these operations must be performed in the specific order or that all the operations shown must be performed to achieve the desired result. Additionally or alternatively, some operations may be omitted, multiple operations may be combined into one operation for execution, and/or one operation may be decomposed into multiple operations for execution.

It should be understood by those skilled in the art that the embodiments of the present application can provide methods, systems and computer program products. Thus, the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

After considering the specification and practicing the invention disclosed here, those skilled in the art will readily come up with other embodiments of the present application. The present application is intended to encompass any variations, usages or applicability changes of the present application, and these variations, usages or applicability changes follow the general principle of the present application and include the common knowledge or customary technological means in the technical field which is not disclosed in the present application. The specification and embodiments are illustrative only, and the true scope and spirit of the present application is pointed out by the following claims.

It should be understood that the present application is not limited to the precise structures which have been described above and shown in the figures, and can be modified and changed without departing from the scope of the present application. The scope of the present application is only limited by the attached claims.

What is claimed is:

1. A method for QoE configuration during an RRC resume process, applied to a first network side apparatus, comprising:

obtaining Quality of Experience, QoE, configuration information of a terminal during a Radio Resource Control, RRC, resume process of the terminal; wherein the QoE configuration information comprises second QoE configuration parameter information only visible to an Access Stratum, AS; and determining a first QoE configuration according to the QoE configuration information, and instructing the terminal to release the first QoE configuration;

wherein the second QoE configuration parameter information comprises at least one of:

at least one of: a service type corresponding to QoE configuration, identification information of QoE configuration, a priority of a service type corresponding to QoE configuration, a priority of identification information of QoE configuration, a QoE configuration type, a cache state of QoE configuration, or a playing delay of QoE configuration;

at least one of: a service type corresponding to a QoE configuration type based on signaling, identification information of QoE configuration based on signaling, a priority of a service type based on signaling, a priority of identification information of QoE configuration based on signaling, a priority of the QoE configuration type based on signaling, a cache state of QoE configuration based on signaling, or a playing delay of QoE configuration based on signaling; or at least one of: a service type corresponding to a QoE configuration type based on management, identification information of QoE configuration based on management, a priority of a service type based on management, a priority of identification information of QoE configuration based on management, a priority of the QoE configuration type based on management, a cache state of QoE configuration based on management, or a playing delay of QoE configuration based on management.

2. The method according to claim 1, wherein the QoE configuration information comprises at least one of:

a QoE configuration with measurement enabled; or a QoE configuration without measurement enabled.

3. The method according to claim 1, wherein the obtaining the QoE configuration information of the terminal during the RRC resume process of the terminal, comprises:

receiving an RRC resume request message transmitted by the terminal; and obtaining the QoE configuration information of the terminal from the terminal or a second network side apparatus, wherein the second network side apparatus is a network side apparatus that configures QoE configuration for the terminal.

4. The method according to claim 3, wherein the obtaining the QoE configuration information of the terminal from the terminal or the second network side apparatus, comprises:

transmitting a QoE configuration information request to the terminal or the second network side apparatus; and receiving the QoE configuration information transmitted by the terminal or the second network side apparatus according to the QoE configuration information request.

5. The method according to claim 1, wherein the determining the first QoE configuration according to the QoE configuration information, comprises at least one of:

determining a service type of the first QoE configuration according to the QoE configuration information;

determining identification information of the first QoE configuration according to the QoE configuration information;

determining a priority of a service type of the first QoE configuration according to the QoE configuration information;

determining a priority of identification information of the first QoE configuration according to the QoE configuration information; or determining a first QoE configuration type according to the QoE configuration information.

6. A method for QoE configuration during an RRC resume process, applied to a terminal, comprising:

transmitting QoE configuration information of the terminal to a first network side apparatus during the RRC resume process; wherein the QoE configuration information comprises second QoE configuration parameter information only visible to an Access Stratum, AS;

receiving a release instruction transmitted by the first network side apparatus, wherein the release instruction comprises a first QoE configuration; and releasing the first QoE configuration according to the release instruction;

wherein the second QoE configuration parameter information comprises at least one of:

at least one of: a service type corresponding to QoE configuration, identification information of QoE configuration, a priority of a service type corresponding to QoE configuration, a priority of identification information of QoE configuration, a QoE configuration type, a cache state of QoE configuration, or a playing delay of QoE configuration;

at least one of: a service type corresponding to a QoE configuration type based on signaling, identification information of QoE configuration based on signaling, a priority of a service type based on signaling, a priority of identification information of QoE configuration based on signaling, a priority of the QoE configuration type based on signaling, a cache state of QoE configuration based on signaling, or a playing delay of QoE configuration based on signaling; or at least one of: a service type corresponding to a QoE configuration type based on management, identification information of QoE configuration based on management, a priority of a service type based on management, a priority of identification information of QoE configuration based on management, a priority of the QoE configuration type based on management, a cache state of QoE configuration based on management, or a playing delay of QoE configuration based on management.

7. The method according to claim 6, wherein the releasing the first QoE configuration according to the release instruction, comprises at least one of:

releasing, according to a service type of the first QoE configuration in the release instruction, a QoE configuration corresponding to the service type;

releasing, according to identification information of the first QoE configuration in the release instruction, a QoE configuration corresponding to the identification information;

releasing, according to a priority of a service type of the first QoE configuration in the release instruction, a QoE configuration corresponding to the priority of the service type;

releasing, according to a priority of identification information of the first QoE configuration in the release instruction, a QoE configuration corresponding to the priority of the identification information; or releasing, according to a first QoE configuration type in the release instruction, a QoE configuration corresponding to the configuration type.

8. A method for QoE configuration during an RRC resume process, applied to a second network side apparatus, comprising:

performing a QoE configuration for a terminal; and transmitting QoE configuration information of the terminal to a first network side apparatus during the RRC resume process of the terminal, wherein the first network side apparatus is an apparatus that performs RRC resume connection with the terminal; the QoE configuration information comprises second QoE configuration parameter information only visible to an Access Stratum, AS;

wherein the second QoE configuration parameter information comprises at least one of:

at least one of: a service type corresponding to QoE configuration, identification information of QoE configuration, a priority of a service type corresponding to QoE configuration, a priority of identification information of QoE configuration, a QoE configuration type, a cache state of QoE configuration, or a playing delay of QoE configuration;

at least one of: a service type corresponding to a QoE configuration type based on signaling, identification information of QoE configuration based on signaling, a priority of a service type based on signaling, a priority of identification information of QoE configuration based on signaling, a priority of the QoE configuration type based on signaling, a cache state of QoE configuration based on signaling, or a playing delay of QoE configuration based on signaling; or at least one of: a service type corresponding to a QoE configuration type based on management, identification information of QoE configuration based on management, a priority of a service type based on management, a priority of identification information of QoE configuration based on management, a priority of the QoE configuration type based on management, a cache state of QoE configuration based on management, or a playing delay of QoE configuration based on management.

9. An apparatus for QoE configuration during an RRC resume process, comprising: a processor; and a memory configured to store processor executable instructions; wherein the processor implements the method of claim 1 by running the executable instructions.

10. A non-transitory computer-readable storage media storing computer instructions, wherein the instructions, when executed by a processor, implements the method of claim 1.

11. An apparatus for QoE configuration during an RRC resume process, comprising: a processor; and a memory configured to store processor executable instructions; wherein the processor implements the method of claim 8 by running the executable instructions.

12. An apparatus for QoE configuration during an RRC resume process, comprising: a processor; and a memory configured to store processor executable instructions; wherein the processor implements the method of claim 10 by running the executable instructions.

13. A non-transitory computer-readable storage media storing computer instructions, wherein the instructions, when executed by a processor, implements the method of claim 8.

14. A non-transitory computer-readable storage media storing computer instructions, wherein the instructions, when executed by a processor, implements the method of claim 10.

* * * * *